Nov. 28, 1967  C. SELLENRAAD ETAL  3,355,583
LIGHTING FITTING

Filed April 20, 1965  2 Sheets-Sheet 1

INVENTORS
CHRISTOFFEL SELLENRAAD
GERHARDUS J. BERNS
BY
Frank R. Trifari
AGENT

Nov. 28, 1967  C. SELLENRAAD ETAL  3,355,583
LIGHTING FITTING
Filed April 20, 1965  2 Sheets-Sheet 2

INVENTORS
CHRISTOFFEL SELLENRAAD
GERHARDUS J. BERNS
BY
AGENT

United States Patent Office 3,355,583
Patented Nov. 28, 1967

3,355,583
LIGHTING FITTING
Christoffel Sellenraad and Gerhardus Johannus Berns, Emmasingel, Eindhoven, Netherlands, assignors to North American Philips Company, Inc., New York, N.Y., a corporation of Delaware
Filed Apr. 20, 1965, Ser. No. 449,550
Claims priority, application Netherlands, May 5, 1964, 64—4,943
2 Claims. (Cl. 240—128)

ABSTRACT OF THE DISCLOSURE

An electric light fixture having a light transparent diffuser and a flexible strip-shaped closing member provided with magnetic material located between the opposite fitting rims of the diffuser and the adjacent portion of the housing.

---

The invention relates to a lighting fitting comprising a housing and a light-transparent closing member or diffuser. It is advantageous to provide a dust-tight closure of such a closing member on the housing.

It is known to use for this connection screws or clamps, which interconnect the member and the housing. It is furthermore known to use a flexible, strip-shaped member as a connecting element between the closing member and the housing, i.e. between the opposite fitting rims of the closing member and of the housing, the flexible strip-shaped closing member containing magnetic material.

The invention is based on the recognition of the fact that when use is made of the said strip-shaped material the closing member may have a very flexible structure. It will be obvious that with the aforesaid connection by means of clamps or screws the structure of the closing member must always be rigid to an extent such that at the areas where no screws or clamps are provided no gaps are left through which dust might penetrate. Moreover, the areas of the closing member where screws and clamps are provided must have a rigidity such that in mounting the heads of the screws or parts of the clamps do not pierce the closing member.

When use is made of the known strip-shaped, magnetic material the closing member need not be rigid at all in order to obtain a dust-tight closure, and it may even be extremely flexible. Then the thickness of the material of the closing member need not be great and in the case of small thickness of the material stiffening ribs will, in general, not be required. This involves that the closing member may be cheap.

The invention has for its object to provide a flexible and cheap closing member for use in a lighting fitting, whilst nevertheless a satisfactory dust-tight closure between the closing member and the housing of the fitting is obtained.

A lighting fitting according to the invention is provided with a housing and a light-transparent closing member and a flexible strip-shaped closing member between opposite fitting rims of the housing and of the closing member, the flexible, strip-shaped closing member containing a magnetic material, which provides the closure between the closing member and the housing and is characterized in that the closing member is made of a synthetic substance of a thickness of 1 mm. at the most, whilst the flexible strip containing the magnetic material is permanently fastened to the fitting rim of the closing member.

It will be obvious that at the area of the fitting rim of the housing ferromagnetic material is provided. With lighting fittings having housings made of a ferromagnetic material, it may be sufficient to provide a bent-over edge of the housing as a fitting rim.

The connection of the strip-shaped material to the closing member may be obtained by glueing for example.

An advantage of a lighting fitting according to the invention is furthermore that, when the fitting rims are not quite smooth, a dust-tight closure can nevertheless be obtained, since, when the strip-shaped material is provided throughout the periphery of the fitting rim of the closing member, the strip can engage, during the mounting operation, intimately the fitting rim of the housing of the fitting.

In a further development of a lighting fitting according to the invention the closing member is shaped in the form of a trough.

The invention will be described more fully with reference to the drawing, which shows one embodiment.

Figure 1:
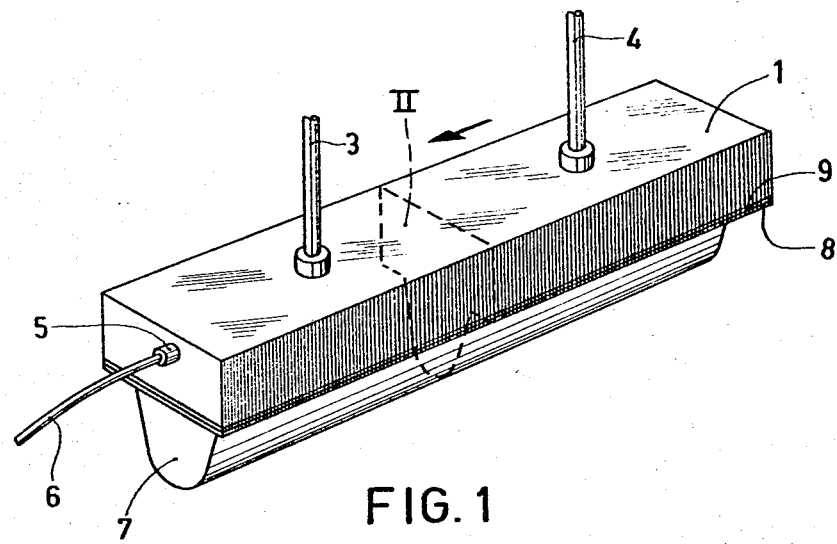
FIG. 1 shows perspectively a lighting fitting according to the invention.

Referring to FIG. 1, reference numeral 1 designates the housing of the lighting fitting. The housing 1 is provided on the bottom side with a fitting rim 2 (see FIG. 2), which extends around the bottom side of the housing. The housing 1 may be mounted with the aid of two pipes 3 and 4 fastened to the upper side of the housing on a ceiling. Reference numeral 5 designates a sleeve arranged in a small side wall of the housing. A double-core current conductor 6, connected to an electric power source, is passed through the sleeve 5. Reference numeral 7 denotes a light-transparent closing member or diffuser, which has the shape of an elongated trough and comprises a fitting rim 8 facing the housing of the fitting, said rim extending throughout the upper periphery of the closing member 7 (see also FIGS. 2 and 3).

A flexible strip 9 of a synthetic substance is glued to the fitting rim 8 of the light-transparent diffuser 7, said strip containing magnetic material. The strip 9 is formed in the shape of a closed stuffing fillet, the main dimensions of which correspond with those of the fitting rim 8 of the closing member 7.

The housing 1 of the fitting is made of steel sheet. The trough-shaped light-transparent diffuser 7 is made of a synthetic substance, the thickness of which is 0.5 mm. Such a hood may be made for example by suction from a flat sheet of material.

Figure 2:
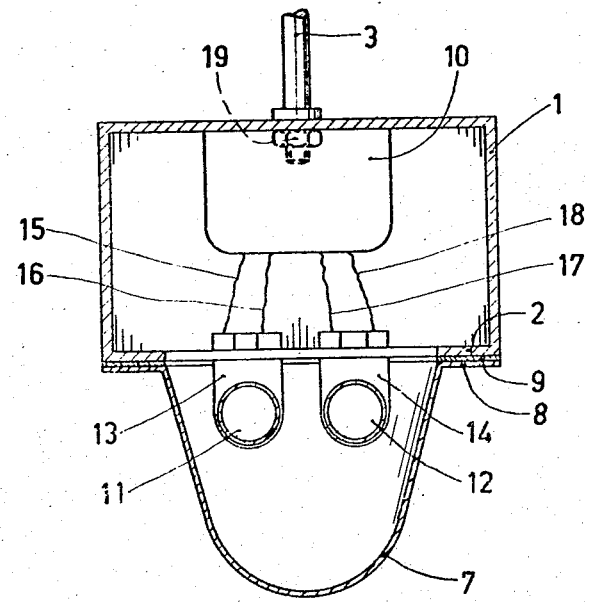
FIG. 2 is a cross sectional view taken on the plane II of the lighting fitting of FIG. 1 in the direction of the arrow of FIG. 1.
Figure 3:
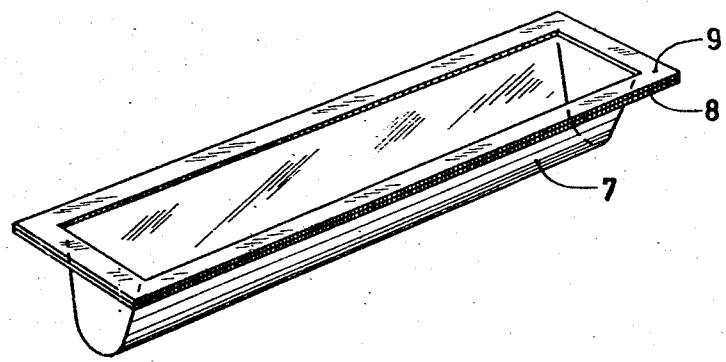
FIG. 3 shows the light-transparent closing member of said fitting provided with a closing strip.

Referring to FIG. 2, reference numeral 10 designates a ballast apparatus for stabilizing two low-pressure mercury-vapour discharge lamps 11 and 12. The lamp 11 is fastened to a holder 13 and the lamp 12 to a holder 14. Reference numerals 15 to 18 designate current supply wires for the lamp holders. The holders 13 and 14 may be secured to the housing 1 by screws. A nut 19 serves for fastening the bar 3 to the upper side of the housing 1.

When the light-transparent diffuser 7 is mounted on the housing 1, the diffuser 7 is disposed on the housing of the fitting so that the tape 9 engages the fitting rim 2 of the housing.

Figure 4:
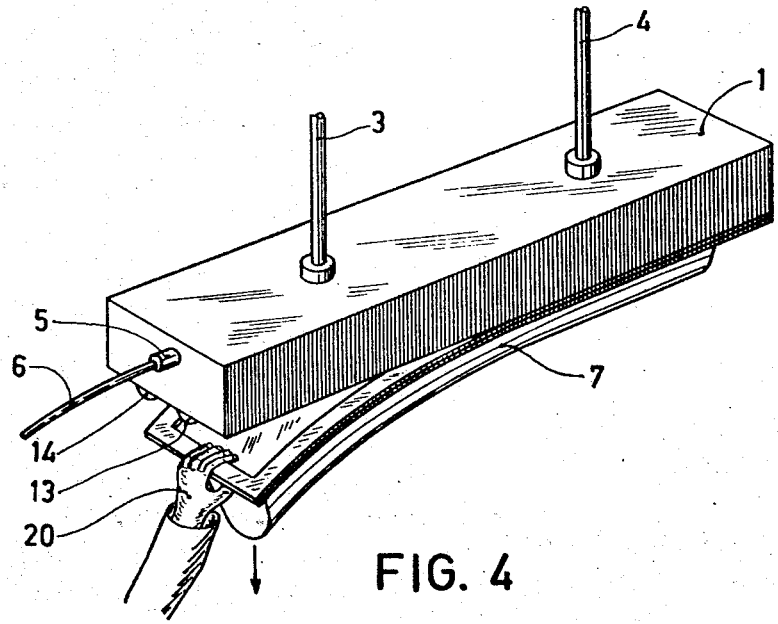
FIG. 4 shows the lighting fitting of FIG. 1, while part of the closing member is withdrawn from the housing.

FIG. 4 shows part of the closing member 7 withdrawn from the housing in the direction of the arrow. The right-hand part of the closing member, viewed in this figure, still adheres to the housing of the fitting. Such a position of the closing member 7 relative to the housing 1 is obtained by the great flexibility of the diffuser 7, owing to the small thickness thereof. The hand 20 in FIG. 4 is that of a person who wants to inspect for example the interior of the fitting. With the other hand (not shown)

this person might perform other manipulations, for example the mounting of a new starter.

What we claim is:

1. An electric light fixture comprising a housing, a light-transparent diffuser, both said housing and diffuser having opposed fitting rims, and flexible magnetic means permanently fixed on said rim of the diffuser, said flexible magnetic means being adapted to flex in order to separate said opposed fitting rims and permit access to the interior of said light fixture, said diffuser being constituted of a synthetic substance of a thickness of not more than 1 mm.

2. An electric light fixture as claimed in claim 1 wherein said light-transparent diffuser is shaped in the form of an elongated trough.

References Cited

UNITED STATES PATENTS

| 2,147,482 | 2/1939 | Butler | 240—128 |
| 2,913,575 | 11/1959 | Lipscomb | 240—78 XR |
| 3,012,132 | 12/1961 | Rosenfield | 240—78 XR |

JOHN M. HORAN, *Primary Examiner.*

NORTON ANSHER, *Examiner.*

C. C. LOGAN II, J. F. PETERS, *Assistant Examiners.*